(12) United States Patent
Geng et al.

(10) Patent No.: US 12,378,965 B2
(45) Date of Patent: Aug. 5, 2025

(54) MOBILE EMERGENCY WATER SUPPLY AND DRAINAGE DEVICE

(71) Applicant: CHANGSHA DEWATER MECHANICAL TECHNOLOGY CO, LTD., Changsha (CN)

(72) Inventors: Wei Geng, Changsha (CN); Yinglai Zhou, Changsha (CN); Panli Zhang, Changsha (CN)

(73) Assignee: CHANGSHA DEWATER MECHANICAL TECHNOLOGY CO, LTD., Changsha (CN)

( * ) Notice: Subject to any disclaimer, the term of this patent is extended or adjusted under 35 U.S.C. 154(b) by 47 days.

(21) Appl. No.: 18/594,866

(22) Filed: Mar. 4, 2024

(65) Prior Publication Data
US 2025/0188938 A1   Jun. 12, 2025

(30) Foreign Application Priority Data
Dec. 8, 2023   (CN) .......................... 202323351998.3

(51) Int. Cl.
| | |
|---|---|
| *F04D 13/08* | (2006.01) |
| *F04D 3/00* | (2006.01) |
| *F04D 13/06* | (2006.01) |
| *F04D 13/12* | (2006.01) |
| *F04D 13/14* | (2006.01) |
| *F04D 29/00* | (2006.01) |
| *F04D 29/42* | (2006.01) |
| *F04D 29/54* | (2006.01) |

(52) U.S. Cl.
CPC ............. *F04D 13/08* (2013.01); *F04D 3/005* (2013.01); *F04D 13/066* (2013.01); *F04D 13/086* (2013.01); *F04D 13/12* (2013.01); *F04D 13/14* (2013.01); *F04D 29/007* (2013.01); *F04D 29/426* (2013.01); *F04D 29/548* (2013.01)

(58) Field of Classification Search
CPC ........ F04D 13/08; F04D 3/005; F04D 13/066; F04D 13/086; F04D 13/12; F04D 13/14; F04D 29/007; F04D 29/426; F04D 29/548
See application file for complete search history.

(56) References Cited

U.S. PATENT DOCUMENTS

| | | | | |
|---|---|---|---|---|
| 4,437,811 A | * | 3/1984 | Iwata | .................... F04B 49/025 417/40 |
| 2006/0207659 A1 | * | 9/2006 | Shaefer | ................. F04D 13/066 137/355.2 |
| 2008/0031752 A1 | * | 2/2008 | Littwin | ................. F04D 13/086 417/411 |

(Continued)

*Primary Examiner* — Hoang M Nguyen

(57) ABSTRACT

A mobile emergency water supply and drainage device is provided, which relates to the technical field of emergency rescue and disaster relief equipment. The device includes a submersible pump, relay pumps, and an electric power supply device for providing electric power for the submersible pump and the relay pumps. Frequency conversion control cabinets are arranged between the submersible pump as well as the relay pumps and the electric power supply device, and the submersible pump and the relay pumps are connected in series by pipelines for remote water supply and drainage. The device further includes a floating body for suspending the submersible pump in water, and the floating body floats on a surface of the water and is connected with the submersible pump through a lifting chain.

20 Claims, 5 Drawing Sheets

(56) References Cited

U.S. PATENT DOCUMENTS

| | | | |
|---|---|---|---|
| 2009/0294378 A1* | 12/2009 | Degiacomo | A01K 63/047 |
| | | | 119/268 |
| 2017/0268522 A1* | 9/2017 | Chandler | F04D 13/02 |
| 2023/0340952 A1* | 10/2023 | Grzeika | F04B 47/06 |

* cited by examiner

MOBILE EMERGENCY WATER SUPPLY AND DRAINAGE DEVICE

CROSS-REFERENCE TO RELATED APPLICATION

This patent application claims the benefit and priority of Chinese Patent Application No. 2023233519983, entitled "MOBILE EMERGENCY WATER SUPPLY AND DRAINAGE DEVICE" filed on Dec. 8, 2023, the disclosure of which is incorporated by reference herein in its entirety as part of the present application.

TECHNICAL FIELD

The present disclosure relates to the technical field of emergency rescue and disaster relief equipment, and in particular to a mobile emergency water supply and drainage device.

BACKGROUND

Emergency drainage and emergency rescue, due to their many particular characteristics, such as the suddenness of events, the urgency of emergency rescue, the complexity of working face, the safety of operation, the randomness of construction environment, the environmental protection of working site, the arbitrariness of time and the long continuous working time, put forward higher and more professional requirements for corresponding equipment. Moreover, in wide-channel water surfaces such as rivers and lakes, ponds and reservoirs and under working conditions of puddle water collection, there will be installation restrictions when submersible pump is used for drainage. The traditional drainage devices are subject to various factors such as large volume, heavy weight, difficult operation layout, limited water supply and drainage distance of low-lift pumps, blockage caused by easy suction of bottom silt impurities during water pumping operation, and potential safety hazards in power supply access.

SUMMARY

The embodiments aim to provide a mobile emergency water supply and drainage device, so as to solve the problems in the prior art. The suction of water bottom silt impurities is reduced, such that the water pump is prevented from blockage and damage caused by silt impurities while maintaining excellent hydraulic performance for a long time, and the service life of the water pump and the safety of quick-connecting transmission of a power supply are improved. Each device for water drainage is light, small and portable, and can achieve large-flow water supply and drainage. Multiple relay pumps are connected in series to achieve high-lift remote water supply and drainage operation, the manual delivery efficiency is high, and the maintenance is simple and convenient, safe and stable.

To achieve the objective above, the present disclosure provides the following technical solution.

A mobile emergency water supply and drainage device includes a submersible pump, relay pumps and an electric power supply device for providing electric power for the submersible pump and the relay pumps. Frequency conversion control cabinets are arranged between the submersible pump as well as the relay pumps and the electric power supply device, and the submersible pump and the relay pumps are connected in series by pipelines for remote water supply and drainage. The mobile emergency water supply and drainage device further comprising a floating body for suspending the submersible pump in water, and the floating body floats on a surface of the water and is connected with the submersible pump through lifting chains.

In some embodiments, the floating body may be made of low-pressure polyethylene, and may be internally provided with a cavity, and the cavity is filled with foam.

In some embodiments, each of the submersible pump and the floating body may be provided with lifting rings, and both ends of each of the lifting chains may be connected with one of the lifting rings of the submersible pump and one of the lifting rings of the floating body, respectively.

In some embodiments, the submersible pump may include a pump body, and a driving mechanism coaxially connected with an inlet port of the pump body. The pump body may include a pump casing, and an impeller rotatably arranged in the pump casing. The driving mechanism may include a casing, and a driving shaft rotatably arranged in the casing. The impeller may be fixedly connected with the driving shaft. An annular flow channel of the inlet end may be formed between the casing and the pump casing. Long rib plates and short rib plates extending in an axial direction may be distributed alternately in a circumferential direction of the casing, and the long rib plates may be connected with the casing and the pump casing, and the short rib plates may be arranged on the casing.

In some embodiments, the casing may include a casing body, an outer end cover, an inner end cover, and a first drainage part. The outer end cover may be arranged on one end, away from the pump casing, of the casing body. The inner end cover may be arranged on one end, adjacent to the pump casing, of the casing body. One end of the first drainage part may be connected with the inner end cover, and an other end of the first drainage part may extend into the pump casing. The outer end cover may be provided with a first bearing, and the inner end cover may be provided with a second bearing. The driving shaft may be installed on the first bearing and the second bearing, may penetrate through the inner end cover and the first drainage part, and may extend into the pump casing to be connected with the impeller.

In some embodiments, each of the relay pumps may include a cylinder and a water pump. The water pump may be at least partially located in the cylinder, and a flow passing channel may be formed between a periphery of the water pump and an inner wall of the cylinder. Both axial ends of the cylinder may be a first water inlet and a first water outlet, respectively. A second drainage part may be provided at one axial side of the water pump, both axial ends of the second drainage part may be a second water inlet and a second water outlet, respectively. The second water inlet of the second drainage part may be connected with the first water outlet of the cylinder. The water pump further may include a rotating component capable of rotating with respect to the second drainage part to drive a water source in the flow passing channel to be drained from the second water outlet. The cylinder may be further internally provided with multiple deflectors distributed in a circumferential direction of the cylinder, and each of the multiple deflectors may extend in an axial direction of the cylinder, and is closer to the first water inlet than the rotating component.

In some embodiments, the mobile emergency water supply and drainage device may further includes a third drainage part arranged in the cylinder. An open end of the third drainage part may face the first water outlet and may be detachably sleeved on a peripheral surface of one side, away from the rotating component in the axial direction, of the water pump. An outer diameter of the third drainage part gradually may increase along a direction adjacent to the first water outlet. Both ends of each of the multiple deflectors in a radial direction of the cylinder may be fixedly connected with an outer wall surface of the third drainage part and an inner wall surface of the cylinder, respectively.

In some embodiments, each of the frequency conversion control cabinets may include a cabinet body and rollers. A frequency converter may be arranged inside the cabinet body, a control panel and an industrial plug mounting plate may be provided at a front side of the cabinet body from top to bottom. A pull rod may be fixedly mounted on a rear side of the cabinet body. A bearing may be fixedly arranged on each of both sides of a bottom of the cabinet body, and each of the rollers may be rotatably connected with the cabinet body by means of the bearing.

In some embodiments, a cable between a frequency conversion control cabinet and the submersible pump may be connected through a quick-connecting plug, and a periphery of the quick-connecting plug may be provided with a waterproof assembly for providing protection.

In some embodiments, the waterproof assembly may include an upper half portion and a lower half portion which may be detachably connected with each other. The upper half portion and the lower half portion may be hermetically connected to form a cavity for accommodating the quick-connecting plug. A groove may be provided at each of a front side and a rear side of the upper half portion or each of a front side and a rear side of the lower half portion, and the groove may be internally provided with a clamping part for hermetically clamping cables at a front side and a rear side of the quick-connecting plug.

Compared with the prior art, the embodiments obtain the following beneficial technical effects.

By providing the floating body floating on the surface of the water, and connecting the floating body with the submersible pump by the lifting chains, the submersible pump is suspended in the water without sinking, and thus the suction of water bottom silt impurities is reduced, the water pump is prevented from blockage and damage caused by silt impurities while maintaining excellent hydraulic performance for a long time, and the service life of the water pump is improved. In addition, during installation, the submersible pump can be directly hoisted into the water, and thus the problem of difficulty in pump lowering in the wide channel river basin is solved. During subsequent maintenance, the underwater submersible pump can be directly towed to the river bank by the floating body for maintenance.

BRIEF DESCRIPTION OF THE DRAWINGS

To describe the technical solutions of the embodiments of the present disclosure or in the prior art more clearly, the following briefly introduces the drawings required for describing the embodiments. Apparently, the drawings in the following description show merely some embodiments of the present disclosure, and those of ordinary skill in the art may still derive other drawings from these drawings without creative efforts.

Figure 1:
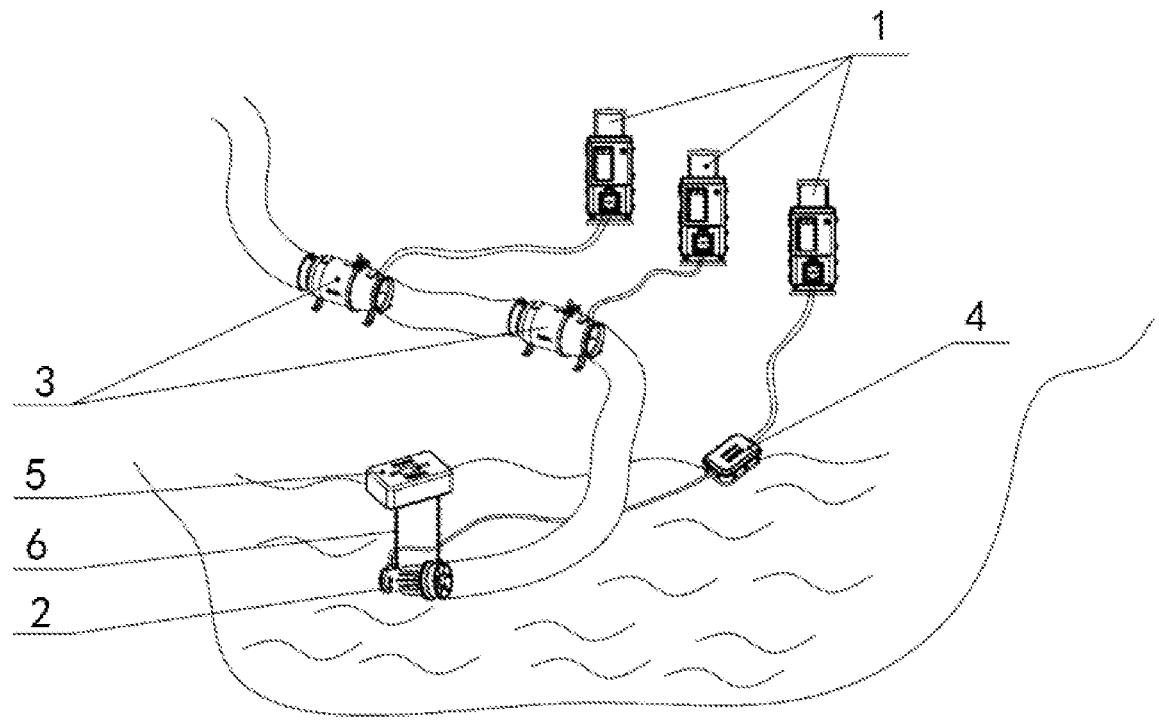
FIG. 1 is a structural schematic diagram of a mobile emergency water supply and drainage device according to the present disclosure.

List of the reference characters: 1 frequency conversion control cabinet; 1.1 pull rod; 1.2 cabinet body; 1.3 control panel; 1.4 industrial plug mounting plate; and 1.5 roller;

2 submersible pump; 2.1 pump body; 2.2 pump casing; 2.3 impeller; 2.4 driving mechanism; 2.5 casing; 2.6 long rib plate; 2.7 short rib plate; 2.8 inner end cover; 2.9 casing body; 2.10 stator; 2.11 rotor; 2.12 outer end cover; 2.13 first bearing; 2.14 driving shaft; 2.15 second bearing; and 2.16 first drainage part;

3 relay pump; 3.1 cylinder; 3.2 first water inlet; 3.3 first housing; 3.4 flow passing channel; 3.5 second housing; 3.6 second water outlet; 3.7 second drainage part; 3.8 second water inlet; 3.9 first water outlet; 3.10 rotating component; 3.11 water pump; 3.12 third drainage part; and 3.13 deflector;

4 waterproof assembly; 4.1 upper half portion; 4.2 lower half portion; 4.3 cable; and 4.4 clamping part;

5 floating body; and 6 lifting chain.

DETAILED DESCRIPTION OF THE EMBODIMENTS

The following clearly and completely describes the technical solutions in the embodiments of the present disclosure with reference to the drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

The embodiments aim to provide a mobile emergency water supply and drainage device, so as to solve the problems in the prior art. The suction of water bottom silt impurities is reduced, and thus the submersible pump can maintain excellent hydraulic performance for a long time.

In order to make the objectives, technical solutions and advantages of the present disclosure more clearly, the present disclosure is further described in detail below with reference to the embodiments.

Please referring to FIG. 1 to FIG. 7, a mobile emergency water supply and drainage device is provided by this embodiment, which includes a submersible pump 2, and relay pumps 3. The submersible pump 2 and the relay pumps 3 are connected in series by pipelines for remote water supply and drainage. The device further includes an electric power supply device for providing electric power for the submersible pump 2 and the relay pumps 3, and frequency conversion control cabinets 1 arranged between the submersible pump 2 as well as the relay pumps 3 and the electric power supply device. The submersible pump 2 is suspended in water by buoyancy of a floating body 5 floating on the surface of the water, and the floating body 5 is connected with the submersible pump 2 by lifting chains 6.

Figure 2:
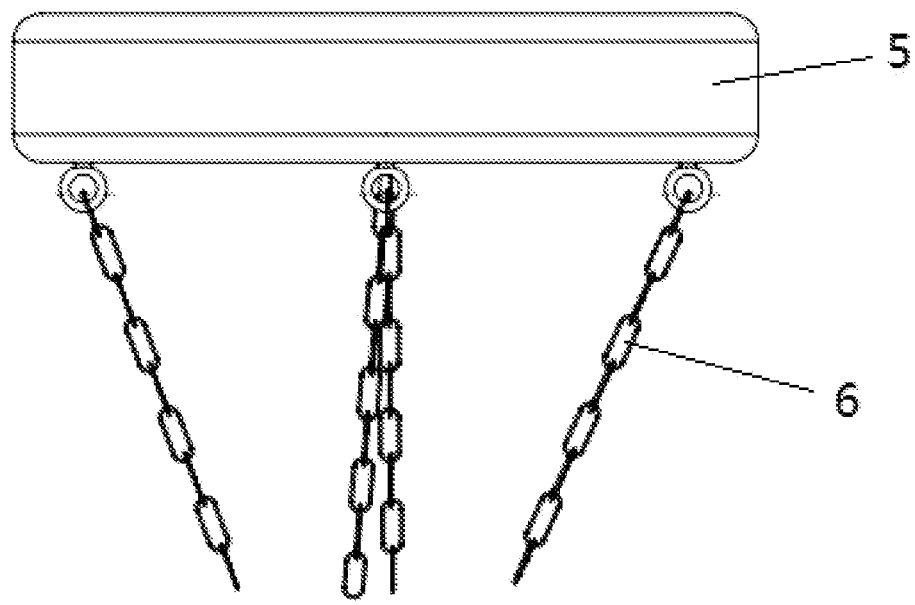
FIG. 2 is a structural schematic diagram of a floating body and lifting chains in FIG. 1.

Specifically, please referring to FIG. 2, the floating body 5 may specifically be in the form of such as a floating block and a floating ring. A hollow structure with a cavity inside is made of low-pressure polyethylene, and the cavity is filled with foam to increase buoyancy. Lifting rings are mounted at proper positions on the surface of each of the floating body 5 and the submersible pump 2, one end of the lifting chain 6 is connected with the lifting ring on the floating body 5, and the other end of the lifting chain 6 is connected with the lifting ring on the submersible pump 2, so as to achieve the connection of the floating body 5 and the submersible pump 2.

The submersible pump 2 is suspended by the floating body 5 in the water without sinking, the suction of water bottom silt impurities is reduced, the water pump 2 is prevented from blockage and damage caused by silt impurities while maintaining excellent hydraulic performance for a long time, and the service life of the water pump 2 is improved. In addition, during installation, the submersible pump 2 can be directly hoisted into the water, and thus the problem of difficulty in pump lowering in the wide channel river basin is solved. During maintenance, the underwater submersible pump 2 can be directly towed to the river bank by the floating body 5.

Figure 3:
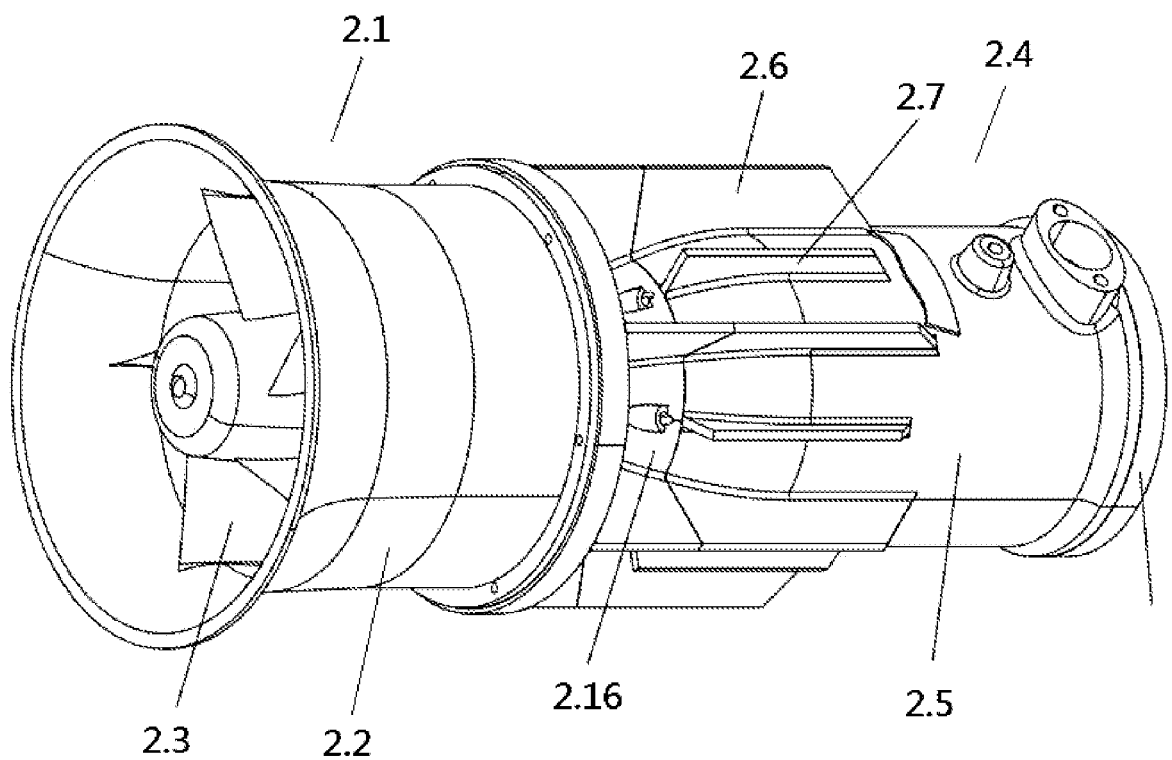
FIG. 3 is a structural schematic diagram of a submersible pump in FIG. 1.
Figure 4:
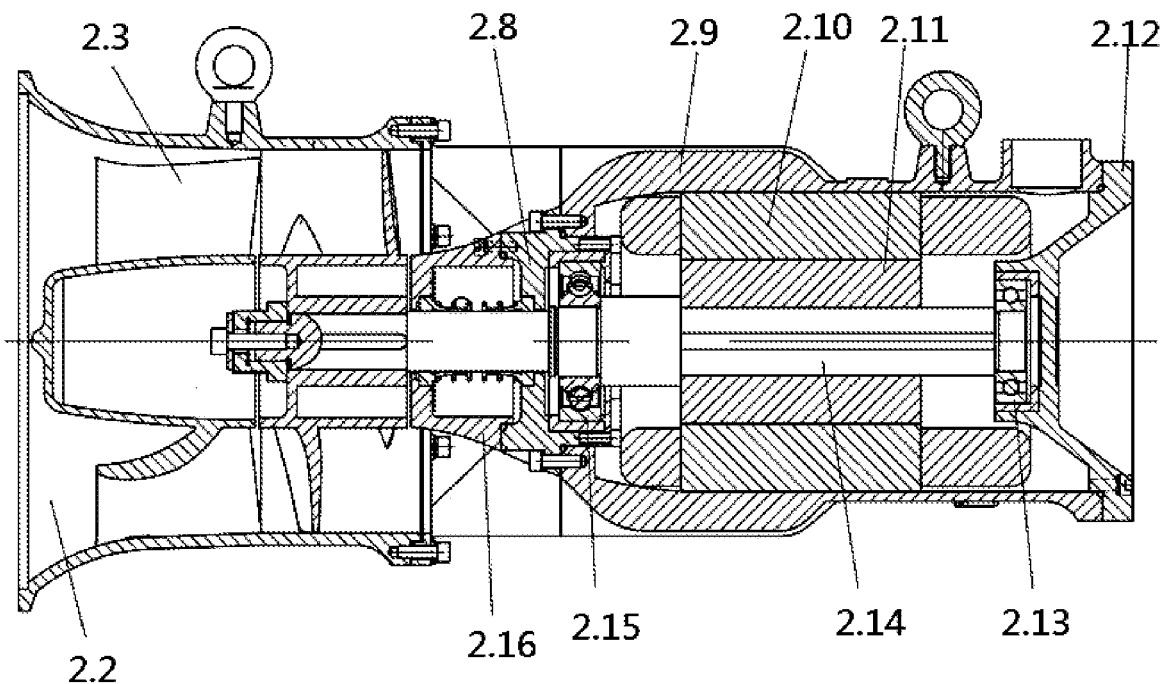
FIG. 4 is a sectional view of FIG. 3.

Please referring to FIG. 3 and FIG. 4, in this embodiment, the submersible pump 2 includes a pump body 2.1, and a driving mechanism 2.4 coaxially connected with an inlet port of the pump body 2.1, and the driving mechanism 2.4 is applied to provide power for the operation of the pump body 2.1, thus forming an axial-flow submersible pump 2 as a whole. The pump body 2.1 includes a pump casing 2.2, and an impeller 2.3 rotatably arranged in the pump casing 2.2. The driving mechanism 2.4 includes a casing 2.5, and a driving shaft 2.14 rotatably arranged in the casing 2.5. The impeller 2.3 is fixedly connected with the driving shaft 2.14, the power of the driving mechanism 2.4 is transmitted by the driving shaft 2.14 to the impeller 2.3 to make the impeller 2.3 rotate. Under the rotation of the impeller 2.3, an external water enters the pump casing 2.2 through a water inlet of the pump casing 2.2, and flows out of the outlet of the pump casing 2.2 after passing through the impeller 2.3, thus forcing a water flow to flow. Each of the casing 2.5 and the pump casing 2.2 may be arranged in a revolving structure with a cylindrical appearance, and an annular flow channel may be formed at a position where the casing 2.5 is connected with the pump casing 2.2, and the annular flow channel is located at a water inlet end of the pump casing 2.2, and thus the external water may enter the pump casing 2.2 through the annular flow channel.

Long rib plates 2.6 and short rib plates 2.7 are distributed alternately in a circumferential direction of the casing 2.5, and extend in an axial direction of the casing 2.5 to divide the annular flow channel into multiple fan-shaped channels. The long rib plate 2.6 and the short rib plate 2.7 are applied to achieve the effect of guiding the water to enter the pumping casing 2.2. In addition, the long rib plate 2.6 is simultaneously connected with the casing 2.5 and the pump casing 2.2 to form a reinforcing structure between the casing 2.5 and the pump casing 2.2, so as to improve the connection stability of the casing 2.5 and the pump casing 2.2, ensure the stability of relative structures of the pump body 2.1 and the driving mechanism 2.4 and in turn to guarantee the stability of the driving shaft 2.14 and the impeller 2.3 during rotation. The short rib plate 2.7 is arranged on the casing 2.5, a radial extension dimension and an axial extension dimension of which can be selected to be smaller than those of the long rib plate 2.6, so as to avoid resistance to the flow of the water on the basis of flow guiding. In this case, the short rib plate 2.7 is equivalent to the long-rib plate 2.6 to play a role of auxiliary flow guiding. In addition, the short rib plate 2.7 is equivalent to forming a cooling fin of the casing 2.5, which can further improve the cooling effect of the casing 2.5, avoid the influence of high temperature, and ensure the stable operation of the emergency rescue pump.

The driving mechanism 2.4 may specifically be a motor. The casing 2.5 of the motor includes a casing body 2.9, an outer end cover 2.12, an inner end cover 2.8, and a first drainage part 2.16. The outer end cover 2.12 is arranged on one end, away from the pump casing 2.2, of the casing body 2.9, and the inner end cover 2.8 is arranged on one end, adjacent to the pump casing 2.2, of the casing body 2.9. One end of the first drainage part 2.16 is connected with the inner end cover 2.8, and the other end of the first drainage part 2.16 extends into the pump casing 2.2. The outer end cover 2.12, the inner end cover 2.8 and the casing body 2.9 form an internal cavity of the motor for accommodating the like structures such as a stator 2.10 and a rotor 2.11, and a sealing structure is arranged at a connecting position, thus making the motor adapt to underwater operating environment. The first drainage part 2.16 and the casing body 2.9 form a streamline structure together to guide a water flow into the pump casing 2.2 smoothly.

During the installation of internal structures of the motor, a first bearing 2.13 and a second bearing 2.15 are respectively arranged on the outer end cover 2.12 and the inner end cover 2.8, a pump shaft is installed on the first bearing 2.13 and the second bearing 2.15, and the first bearing 2.13 and the second bearing 2.15 are applied to form a rotatable support for the pump shaft. In order to guarantee axial limitation, a shaft shoulder may be arranged on the pump shaft, and the bearings are installed on the shaft shoulder to limit the axial direction of the pump shaft. The pump shaft, after penetrating through the inner end cover 2.8 and the first drainage part 2.16, extends into the pump casing 2.2 to be connected with the impeller 2.3, so as to transmit the power of the motor into the pump body assembly. A mechanical seal may be arranged at a connecting position of the first drainage part 2.16 and the pump shaft, thus preventing the water flow from entering the motor assembly.

Figure 5:
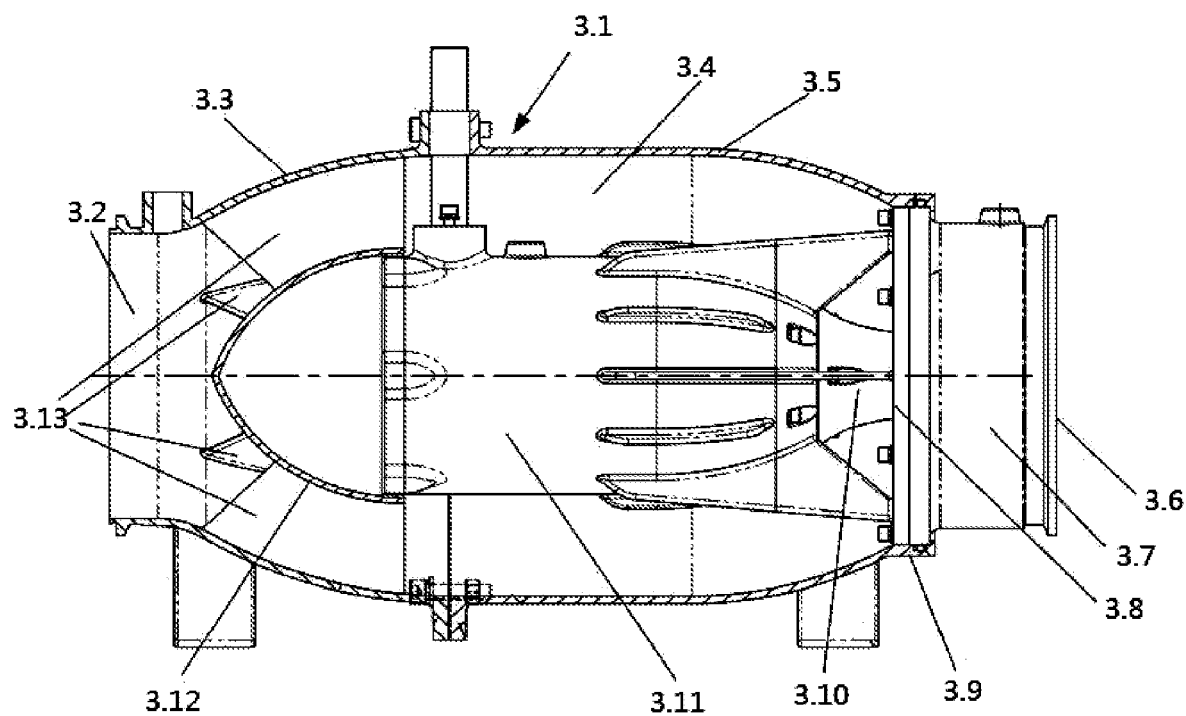
FIG. 5 is a structural schematic diagram of a relay mechanism in FIG. 1.

Please referring to FIG. 5, the relay pump 3 in this embodiment includes a cylinder 3.1, and a water pump 3.11. The water pump 3.11 is at least partially located in the cylinder 3.1, and a flow passing channel 3.4 is formed between the periphery of the water pump 3.11 and an inner wall of the cylinder 3.1. Both ends of the cylinder 3.1 in an axial direction of the cylinder 3.1 are a first water inlet 3.2 and a first water outlet 3.9, respectively. A second drainage part 3.7 is provided at one axial side of the water pump 3.11, and both axial ends of the second drainage part 3.7 are a second water inlet 3.8 and a second water outlet 3.6, respectively. The second water inlet 3.8 of the second drainage part 3.7 is connected with the first water outlet 3.9 of the cylinder 3.1. A rotating component 3.10 is further provided at one axial side of the water pump 3.11, and is capable of rotating with respect to the second drainage part 3.7 to drive a water source in the flow passing channel 3.4 to be drained from the second water outlet 3.6. The cylinder 3.1 is internally provided with multiple deflectors 3.13 distributed in a circumferential direction of the cylinder 3.1, and each deflector 3.13 extends in the axial direction of the cylinder 3.1, and is adjacent to the first water inlet 3.2 than the rotating component 3.10.

The relay pump 3 further includes a third drainage part 3.12 arranged in the cylinder 3.1, and an open end of the third drainage part 3.12 faces the first water outlet 3.9 and is detachably sleeved on a circumferential surface of one side, away from the rotating component 3.10 in the axial direction, of the water pump 3.11. An outer diameter of the third drainage part 3.12 gradually increases along a direction adjacent to the first water outlet 3.9, such that the water can enter the flow passing channel 3.4 under the guidance of the third drainage part 3.12 and is prevented from directly impacting an end face of the water pump 3.11. The multiple deflectors 3.13 are uniformly distributed in a circumferential direction of the cylinder 3.1, and two ends of each deflector 3.13 in a radial direction of the cylinder 3.1 is fixedly connected with an outer wall surface of the third drainage part 3.12 and an inner wall surface of the cylinder 3.1, respectively. The deflector 3.13 and the third drainage part 3.12 may be configured to fix and limit the water pump 3.11, thus improving the operation stability of the whole device. Preferably, the cylinder 3.1 includes a first housing 3.3, and a second housing 3.5. One end of the first housing 3.3 is a first water inlet 3.2, one end of the second housing 3.5 is a first water outlet 3.9, and the other end of the first housing 3.3 and the other end of the second housing 3.5 may be detachably connected with each other by flanges in a sealing manner to form the cylinder 3.1. The detachable cylinder 3.1 is provided, which is convenient to overhaul, assemble and carry.

In this embodiment, cables 4.3 of the frequency conversion control cabinet 1 and the submersible pump 2 are connected through a quick-connecting plug, and the periphery of the quick-connecting plug is provided with a waterproof assembly 4 for providing protection.

Figure 6:
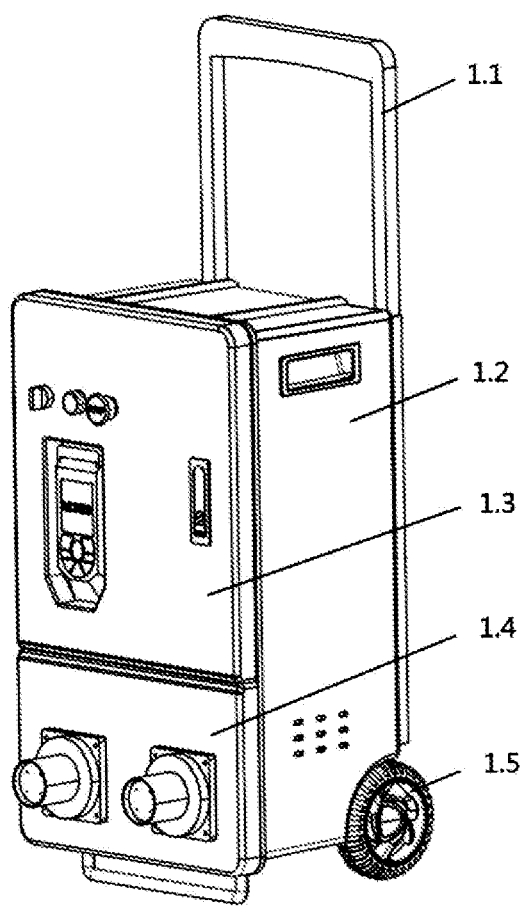
FIG. 6 is a structural schematic diagram of a frequency conversion control cabinet in FIG. 1.

Please referring to FIG. 6, the frequency conversion control cabinet includes a cabinet body 1.2 and rollers 1.5. A frequency converter is installed inside the cabinet body 1.2. A control panel 1.3 and an industrial plug mounting plate 1.4 are provided at the front side of the cabinet body 1.2 from top to bottom. A frequency converter control disc, a control button, an emergency stop button, a status indicator lamp and the like are arranged on the control panel 1.3. Multiple industrial plugs are arranged on the industrial plug mounting plate 1.4. A pull rod 1.1 is fixedly installed at the rear side of the cabinet body 1.2, bearings are fixedly mounted at both sides of the bottom of the cabinet body 1.2, and the rollers 1.5 are rotatably mounted on the cabinet body 1.2 by means of the bearings. The providing of the pull rod 1.1 and the roller 1.5 can alleviate the physical consumption of handling personnel in the transfer process, and the multiple industrial plugs can be configured to connect such as the electric power supply device, the submersible pump 2 and the relay pump 3.

Figure 7:
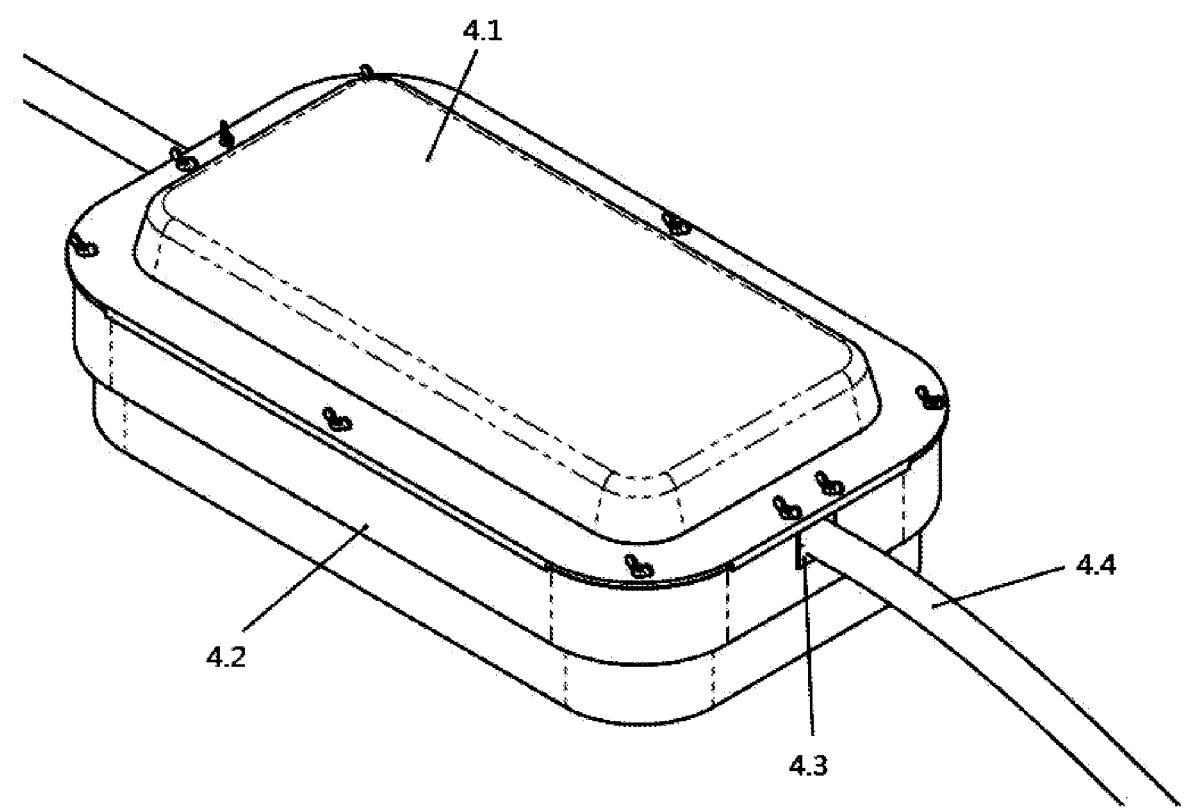
FIG. 7 is a structural schematic diagram of a waterproof assembly in FIG. 1.

Please referring to FIG. 7, the waterproof assembly 4 includes an upper half portion 4.1 and a lower half portion 4.2, which are detachably integrated by fasteners, clamping or other forms. A sealing ring is arranged at a contact part of the upper half portion 4.1 and the lower half portion 4.2 to form a sealed connection, and both the upper half portion 4.1 and the lower half portion 4.2 are of hollow structures, which enclose to form a cavity for accommodating quick-connecting plugs. The front side and the rear side of either the upper half portion 4.1 or the lower half portion 4.2 are provided with grooves, and a clamping part 4.4 for sealing and clamping cables 4.3 at the front side and the rear side of the quick-connecting plug is arranged in each groove, and the clamping part 4.4 and the sealing ring between the upper half portion 4.1 and the lower half portion 4.2 can jointly achieve the whole sealing of the waterproof assembly 4. In addition, the internal cavity structure can enhance the buoyancy of the waterproof assembly 4, such that the waterproof assembly 4 can float on the water surface with the quick-connecting plug, thus reducing the risk of corrosion and power failure.

Adaptive changes made according to actual needs are within the scope of protection of the present disclosure.

It should be noted that it is apparent to those skilled in the art that the present disclosure is not limited to the details of the above exemplary embodiments, and can be realized in other specific forms without departing from the spirit or basic characteristics of the present disclosure. Therefore, the embodiments should be considered as exemplary rather than non-limiting in all aspects, and the scope of the present disclosure is defined by the appended claims rather than the above description, so it is intended to embrace all changes that fall within the meaning and range of equivalents of the claims. Any reference signs in the claims should not be regarded as limiting the claims involved.

What is claimed is:

1. A mobile emergency water supply and drainage device, comprising a submersible pump, relay pumps and an electric power supply device for providing electric power for the submersible pump and the relay pumps, wherein frequency conversion control cabinets are arranged between the submersible pump as well as the relay pumps and the electric power supply device, and the submersible pump and the relay pumps are connected in series by pipelines for remote water supply and drainage; the mobile emergency water supply and drainage device further comprising a floating body for suspending the submersible pump in water, and the floating body floats on a surface of the water and is connected with the submersible pump through lifting chains.

2. The mobile emergency water supply and drainage device according to claim 1, wherein the floating body is made of low-pressure polyethylene, and is internally provided with a cavity, and the cavity is filled with foam.

3. The mobile emergency water supply and drainage device according to claim 2, wherein each of the submersible pump and the floating body is provided with lifting rings, and both ends of each of the lifting chains are connected with one of the lifting rings of the submersible pump and one of the lifting rings of the floating body, respectively.

4. The mobile emergency water supply and drainage device according to claim 1, wherein the submersible pump comprises a pump body, and a driving mechanism coaxially connected with an inlet port of the pump body; the pump body comprises a pump casing, and an impeller rotatably arranged in the pump casing; the driving mechanism comprises a casing, and a driving shaft rotatably arranged in the casing; the impeller is fixedly connected with the driving shaft; an annular flow channel of the inlet end is formed between the casing and the pump casing; long rib plates and short rib plates extending in an axial direction are distributed alternately in a circumferential direction of the casing, and the long rib plates are connected with the casing and the pump casing, and the short rib plates are arranged on the casing.

5. The mobile emergency water supply and drainage device according to claim 4, wherein the casing comprises a casing body, an outer end cover, an inner end cover, and a first drainage part; the outer end cover is arranged on one end, away from the pump casing, of the casing body, the inner end cover is arranged on one end, adjacent to the pump casing, of the casing body; one end of the first drainage part is connected with the inner end cover, and an other end of the first drainage part extends into the pump casing; the outer end cover is provided with a first bearing, and the inner end cover is provided with a second bearing; the driving shaft is installed on the first bearing and the second bearing, penetrates through the inner end cover and the first drainage part, and extends into the pump casing to be connected with the impeller.

6. The mobile emergency water supply and drainage device according to claim 1, wherein each of the relay pumps comprises a cylinder and a water pump, the water pump is at least partially located in the cylinder, and a flow passing channel is formed between a periphery of the water pump and an inner wall of the cylinder; both axial ends of the cylinder are a first water inlet and a first water outlet, respectively; a second drainage part is provided at one axial side of the water pump, both axial ends of the second drainage part are a second water inlet and a second water outlet, respectively; the second water inlet of the second drainage part is connected with the first water outlet of the cylinder; the water pump further comprises a rotating component capable of rotating with respect to the second drainage part to drive a water source in the flow passing channel to be drained from the second water outlet; the cylinder is further internally provided with a plurality of deflectors distributed in a circumferential direction of the cylinder, and each of the plurality of deflectors extends in an axial direction of the cylinder, and is closer to the first water inlet than the rotating component.

7. The mobile emergency water supply and drainage device according to claim 6, further comprising a third drainage part arranged in the cylinder, an open end of the third drainage part faces the first water outlet and is detachably sleeved on a peripheral surface of one side, away from the rotating component in the axial direction, of the water pump, and an outer diameter of the third drainage part gradually increases along a direction adjacent to the first water outlet; and both ends of each of the plurality of deflectors in a radial direction of the cylinder are fixedly connected with an outer wall surface of the third drainage part and an inner wall surface of the cylinder, respectively.

8. The mobile emergency water supply and drainage device according to claim 1, wherein each of the frequency conversion control cabinets comprises a cabinet body and rollers, a frequency converter is arranged inside the cabinet body, a control panel and an industrial plug mounting plate are provided at a front side of the cabinet body from top to bottom; a pull rod is fixedly mounted on a rear side of the cabinet body, a bearing is fixedly arranged on each of both sides of a bottom of the cabinet body, and each of the rollers is rotatably connected with the cabinet body by means of the bearing.

9. The mobile emergency water supply and drainage device according to any one of claim 1, wherein a cable between a frequency conversion control cabinet and the submersible pump is connected through a quick-connecting plug, and a periphery of the quick-connecting plug is provided with a waterproof assembly for providing protection.

10. The mobile emergency water supply and drainage device according to claim 9, wherein the waterproof assembly comprises an upper half portion and a lower half portion which are detachably connected with each other; the upper half portion and the lower half portion are hermetically connected to form a cavity for accommodating the quick-connecting plug; a groove is provided at each of a front side and a rear side of the upper half portion or each of a front side and a rear side of the lower half portion, and the groove is internally provided with a clamping part for hermetically clamping cables at a front side and a rear side of the quick-connecting plug.

11. The mobile emergency water supply and drainage device according to claim 9, wherein the floating body is made of low-pressure polyethylene, and is internally provided with a cavity, and the cavity is filled with foam.

12. The mobile emergency water supply and drainage device according to claim 11, wherein each of the submersible pump and the floating body is provided with lifting rings, and both ends of each of the lifting chains are connected with one of the lifting rings of the submersible pump and one of the lifting rings of the floating body, respectively.

13. The mobile emergency water supply and drainage device according to claim 9, wherein the submersible pump comprises a pump body, and a driving mechanism coaxially connected with an inlet port of the pump body; the pump body comprises a pump casing, and an impeller rotatably arranged in the pump casing; the driving mechanism comprises a casing, and a driving shaft rotatably arranged in the casing; the impeller is fixedly connected with the driving shaft; an annular flow channel of the inlet end is formed between the casing and the pump casing; long rib plates and short rib plates extending in an axial direction are distributed alternately in a circumferential direction of the casing, and the long rib plates are connected with the casing and the pump casing, and the short rib plates are arranged on the casing.

14. The mobile emergency water supply and drainage device according to claim 13, wherein the casing comprises a casing body, an outer end cover, an inner end cover, and a first drainage part; the outer end cover is arranged on one end, away from the pump casing, of the casing body, the inner end cover is arranged on one end, adjacent to the pump casing, of the casing body; one end of the first drainage part is connected with the inner end cover, and an other end of the first drainage part extends into the pump casing; the outer end cover is provided with a first bearing, and the inner end cover is provided with a second bearing; the driving shaft is installed on the first bearing and the second bearing, penetrates through the inner end cover and the first drainage part, and extends into the pump casing to be connected with the impeller.

15. The mobile emergency water supply and drainage device according to claim 9, wherein each of the relay pumps comprises a cylinder and a water pump, the water pump is at least partially located in the cylinder, and a flow passing channel is formed between a periphery of the water pump and an inner wall of the cylinder; both axial ends of the cylinder are a first water inlet and a first water outlet, respectively; a second drainage part is provided at one axial side of the water pump, both axial ends of the second drainage part are a second water inlet and a second water outlet, respectively; the second water inlet of the second drainage part is connected with the first water outlet of the cylinder; the water pump further comprises a rotating component capable of rotating with respect to the second drainage part to drive a water source in the flow passing channel to be drained from the second water outlet; the cylinder is further internally provided with a plurality of deflectors distributed in a circumferential direction of the cylinder, and each of the plurality of deflectors extends in an axial direction of the cylinder, and is closer to the first water inlet than the rotating component.

16. The mobile emergency water supply and drainage device according to claim 15, further comprising a third drainage part arranged in the cylinder, an open end of the third drainage part faces the first water outlet and is detachably sleeved on a peripheral surface of one side, away from the rotating component in the axial direction, of the water pump, and an outer diameter of the third drainage part gradually increases along a direction adjacent to the first water outlet; and both ends of each of the plurality of deflectors in a radial direction of the cylinder are fixedly connected with an outer wall surface of the third drainage part and an inner wall surface of the cylinder, respectively.

17. The mobile emergency water supply and drainage device according to claim 9, wherein each of the frequency conversion control cabinets comprises a cabinet body and rollers, a frequency converter is arranged inside the cabinet body, a control panel and an industrial plug mounting plate are provided at a front side of the cabinet body from top to bottom; a pull rod is fixedly mounted on a rear side of the cabinet body, a bearing is fixedly arranged on each of both sides of a bottom of the cabinet body, and each of the rollers is rotatably connected with the cabinet body by means of the bearing.

18. The mobile emergency water supply and drainage device according to claim 10, wherein the floating body is made of low-pressure polyethylene, and is internally provided with a cavity, and the cavity is filled with foam.

19. The mobile emergency water supply and drainage device according to claim 18, wherein each of the submersible pump and the floating body is provided with lifting rings, and both ends of each of the lifting chains are connected with one of the lifting rings of the submersible pump and one of the lifting rings of the floating body, respectively.

20. The mobile emergency water supply and drainage device according to claim 10, wherein the submersible pump comprises a pump body, and a driving mechanism coaxially connected with an inlet port of the pump body; the pump body comprises a pump casing, and an impeller rotatably arranged in the pump casing; the driving mechanism comprises a casing, and a driving shaft rotatably arranged in the casing; the impeller is fixedly connected with the driving shaft; an annular flow channel of the inlet end is formed between the casing and the pump casing; long rib plates and short rib plates extending in an axial direction are distributed alternately in a circumferential direction of the casing, and the long rib plates are connected with the casing and the pump casing, and the short rib plates are arranged on the casing.

* * * * *